(Model.)

H. E. PRIDMORE.
GRAIN BINDER.

No. 361,646. Patented Apr. 19, 1887.

WITNESSES
Wm A. Skinkle
Geo. W. Young

INVENTOR
Henry E Pridmore
By his Attorneys

(Model.)

H. E. PRIDMORE.
GRAIN BINDER.

No. 361,646.  Patented Apr. 19, 1887.

WITNESSES
Wm. A. Skinkle.
Geo. W. Young.

INVENTOR
Henry E. Pridmore.

By his Attorneys
Parkinson & Parkinson

N. PETERS, Photo-Lithographer, Washington, D. C.

(Model.)

H. E. PRIDMORE.
GRAIN BINDER.

No. 361,646. Patented Apr. 19, 1887.

WITNESSES
Wm A. Skinkle
Geo. W. Young

INVENTOR
Henry E Pridmore
By his Attorneys
Parkinson & Parkinson (Model.)

H. E. PRIDMORE.
GRAIN BINDER.

No. 361,646.  Patented Apr. 19, 1887.

WITNESSES
Wm A. Skinkle
Geo. W. Young.

INVENTOR
Henry E. Pridmore.
By his Attorneys (Model.)

H. E. PRIDMORE.
GRAIN BINDER.

No. 361,646. Patented Apr. 19, 1887.

WITNESSES
Wm. A. Skinkle.
Geo. W. Young.

INVENTOR
Henry E. Pridmore.
By his Attorneys
Parkinson & Parkinson (Model.)

H. E. PRIDMORE.
GRAIN BINDER.

No. 361,646.  Patented Apr. 19, 1887.

WITNESSES
Wm. A. Skinkle
Geo. W. Young

INVENTOR
Henry E. Pridmore
By his Attorneys
Rasmussen & Rasmussen (Model.)

H. E. PRIDMORE.
GRAIN BINDER.

No. 361,646.

Patented Apr. 19, 1887.

WITNESSES
Wm. A. Skinkle
Geo. W. Young

INVENTOR
Henry E. Pridmore
By his Attorneys
Parkinson & Parkinson (Model.)

H. E. PRIDMORE.
GRAIN BINDER.

No. 361,646. Patented Apr. 19, 1887.

WITNESSES
Wm A. Skinkle
Geo. W. Young

INVENTOR
Henry E. Pridmore
By his Attorneys

UNITED STATES PATENT OFFICE.

HENRY E. PRIDMORE, OF CHICAGO, ILLINOIS, ASSIGNOR TO THE McCORMICK HARVESTING MACHINE COMPANY, OF SAME PLACE.

GRAIN-BINDER.

SPECIFICATION forming part of Letters Patent No. 361,646, dated April 19, 1887.

Application filed June 8, 1885. Serial No. 168,022. (Model.)

*To all whom it may concern:*

Be it known that I, HENRY E. PRIDMORE, a citizen of the United States, residing at Chicago, in the county of Cook and State of Illinois, have invented certain new and useful Improvements in Grain-Binders, of which the following is a specification.

My invention relates, primarily, to an improved construction of the cord-knotter; and in this regard it consists in combining in an oscillating knotter a bill-shaped hook having a clamping shoulder or chin, and positively actuated with a second and shorter hook or jaw, the point of which rests against said chin, and is held thereagainst to follow the positive motions of the bill and to clamp the cord by spring-pressure.

It consists, also, in combining with a knotter of essentially such construction or form, and with a fixed holder for the cord, a secondary holder which grasps the strands of cord and then moves toward and past the knotter in such manner as to direct and guide the cord thereabout and thereto in the tying operation.

It consists, further, in various combinations and details of construction adapted to these ends and to operate such devices.

For the purpose of illustrating my invention, I have shown it in connection with a head constructed for use upon the well-known reciprocating binder made by the McCormick Harvesting Machine Company, without intending thereby to be in any respect limited to its employment upon such or any particular type of machine.

In the drawings, Fig. 1ᵃ is a detail view of the cap-plate. Figs. 28 to 36, inclusive, are plan views of the same corresponding in position or stage of operation to those shown in the preceding group, except that the seventh stage, corresponding to Fig. 24, is purposely omitted.

A is a supporting-stock for the various parts of my invention, adapted, as before intimated, to slide upon the ways of a reciprocating grain-binder. Journaled upon this stock by a pivotal connection, $a$, is a disk, B, having cam grooves and ledges, to be hereinafter described, for the purpose, illustratively, of operating the knotter and stationary and swinging holders.

The cam-disk has a delay-pinion, B', clutched thereto by a single spring-pressed driving-lug, $b$, engaging with a single ratchet-tooth, $b'$, on the disk, so that when the binder moves inward to receive the grain the pinion may fail to engage and may run sufficiently beyond the tooth before the end of the inward traverse to enable the binder-arm to completely deliver the cord to the holder in the outward movement before said pinion engages with the cam-disk and begins to drive it.

Figure 1:
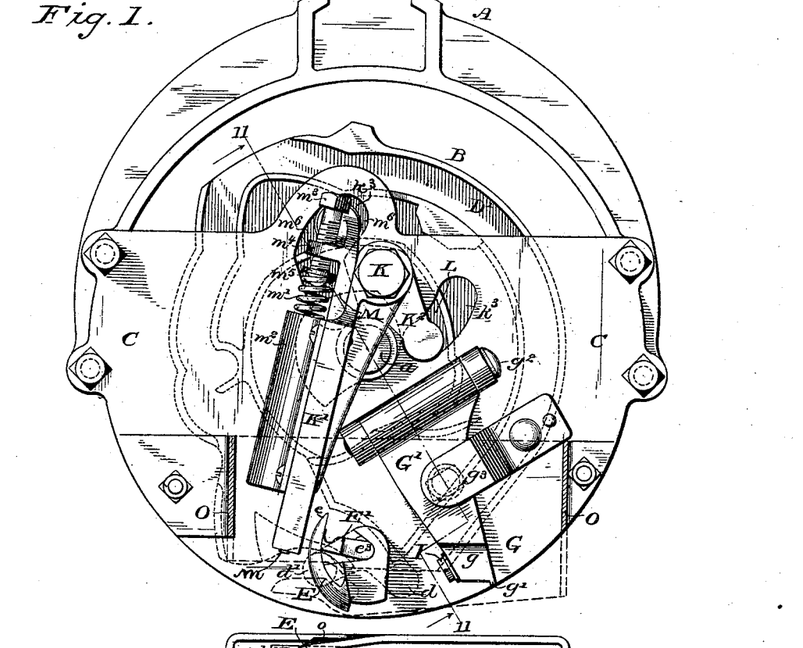
Figure 1 is a top plan view of a binding-head embodying my invention, the slotted cap-plate being removed.
Figures 1A, 34, 35:
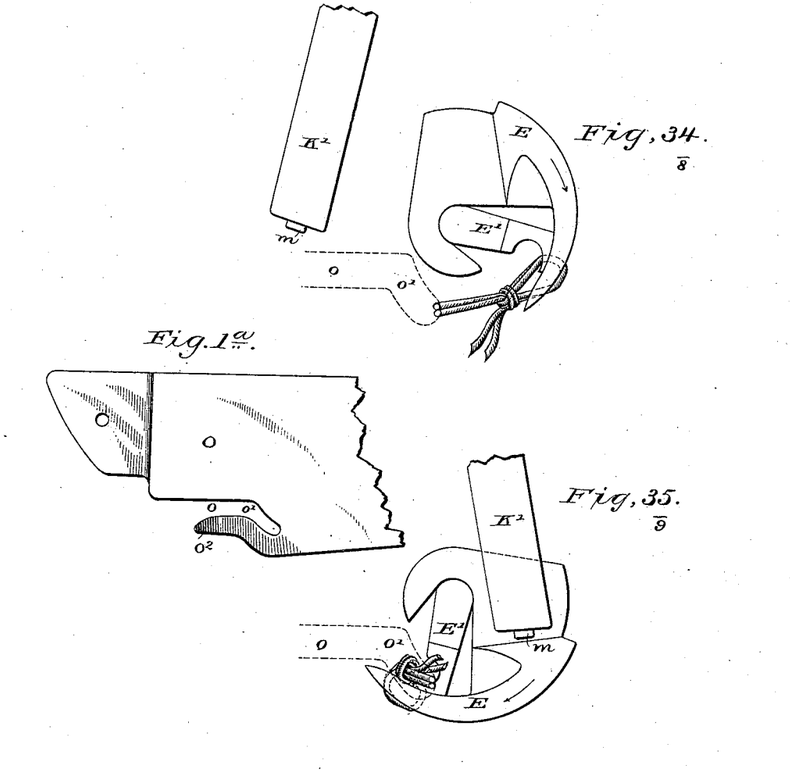
Figure 2:
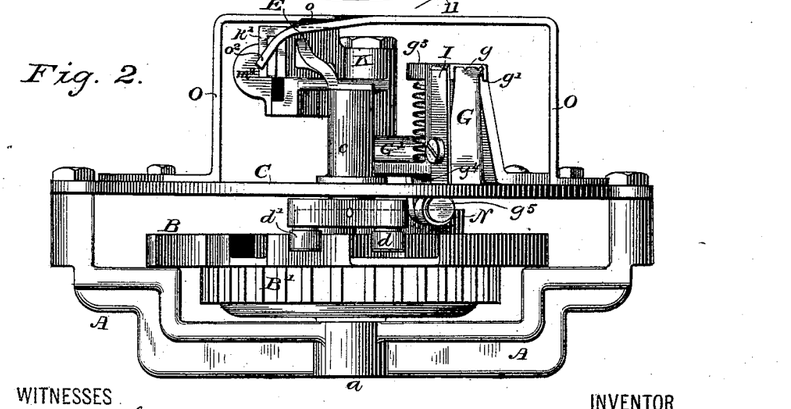
Fig. 2 is an elevation of such head with the cap-plate in position.
Figures 3, 4, 5, 6, 7, 8, 9, 10, 11, 12:
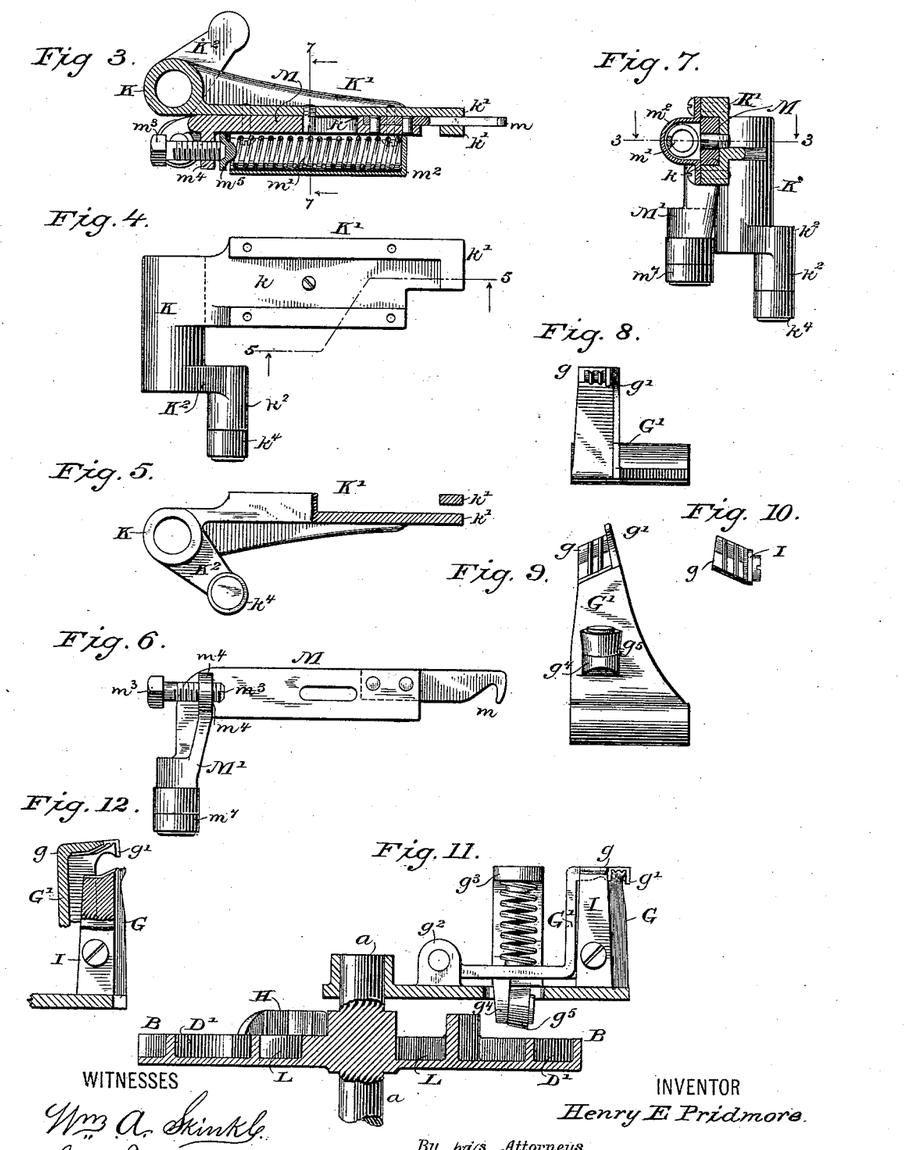
Figs. 3 to 7, inclusive, are details of the secondary or swinging holder.
Figs. 8 to 12, details of the stationary holder.
Figure 13:
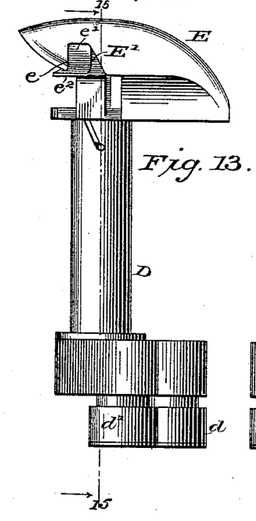
Figs. 13 to 15, details in elevation and vertical section of the knotter or tying-bill.
Figure 14:
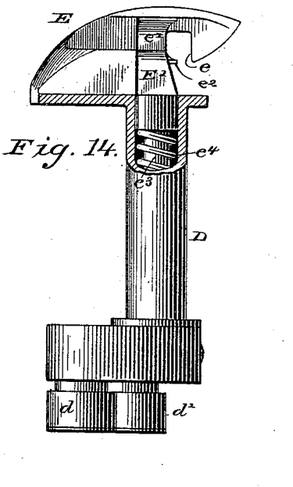
Figure 15:
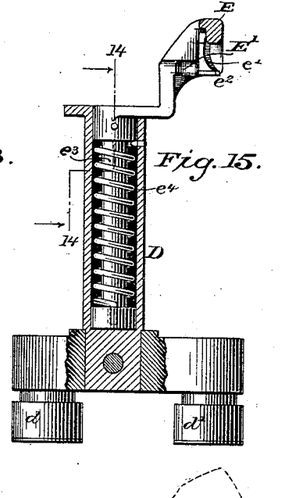
Figure 16:
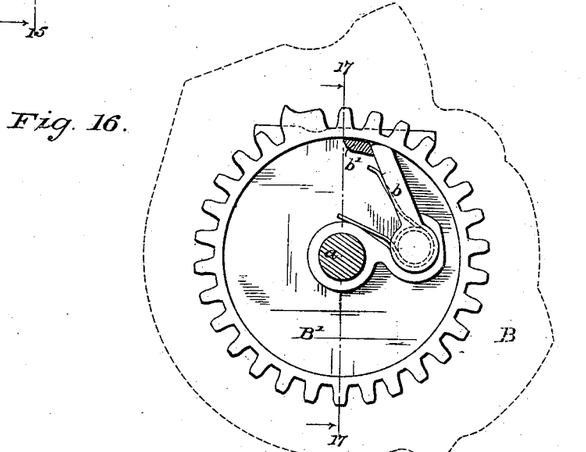
Figs. 16 and 17 illustrate the connection between the cam-disk, by which the various operative parts in the head are given their motions, and the pinion which drives it.
Figure 17:
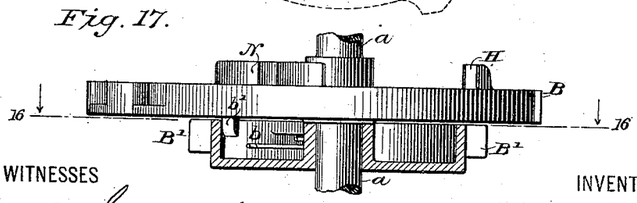
Figure 18:
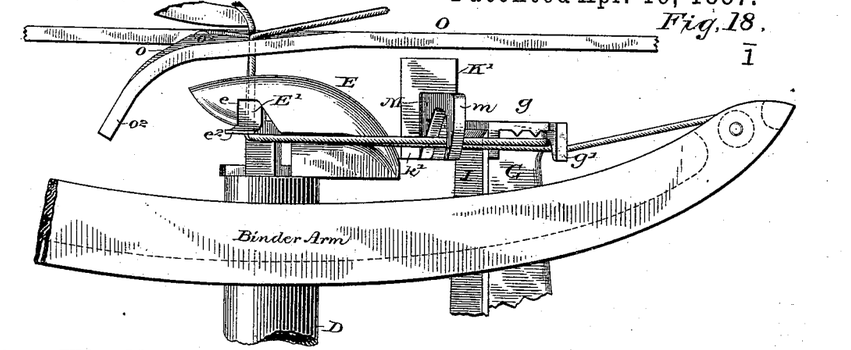
Figs. 18 to 27, inclusive, are views in elevation of the knotter and cord-holders, shown at ten different stages of forming the knot, the small numerals beneath the figure-numbers indicating the number or stage of operation.
Figure 19:
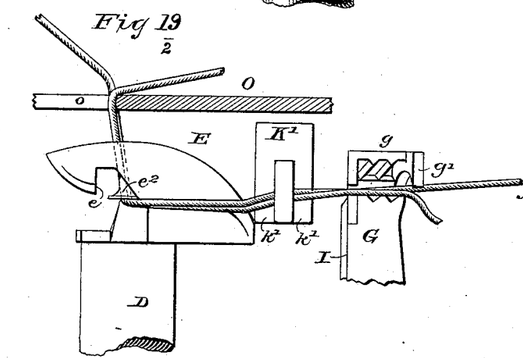
Figure 20:
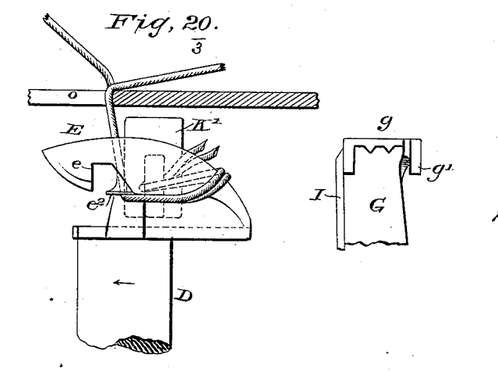
Figure 21:
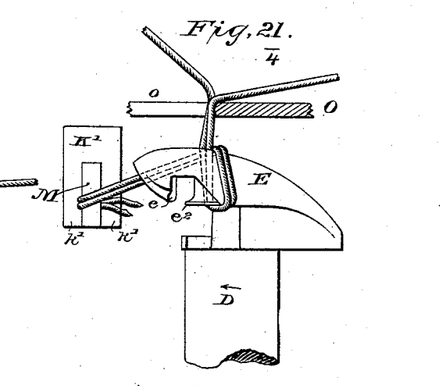
Figure 22:
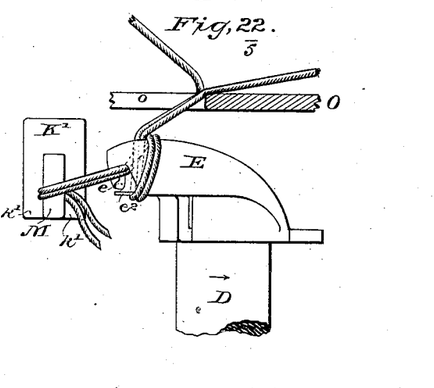
Figure 23:
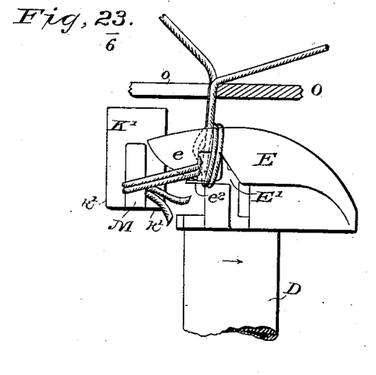
Figure 24:
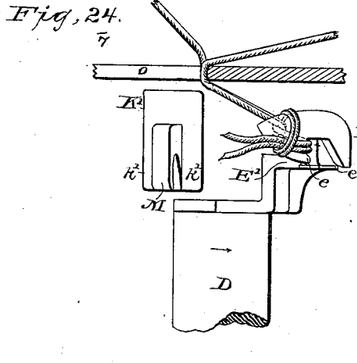
Figure 25:
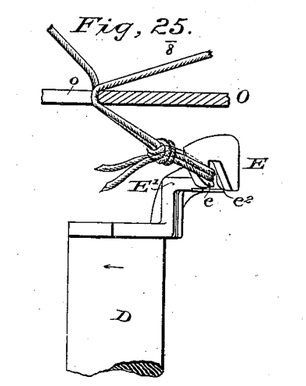
Figure 26:
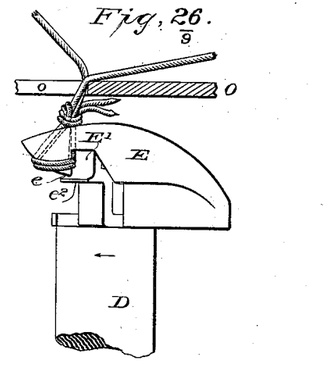
Figure 27:
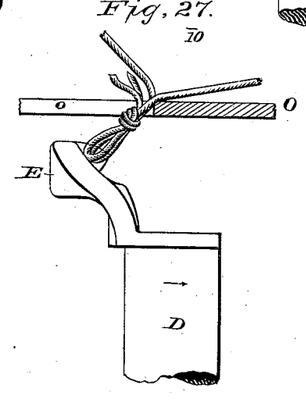
Figure 28:
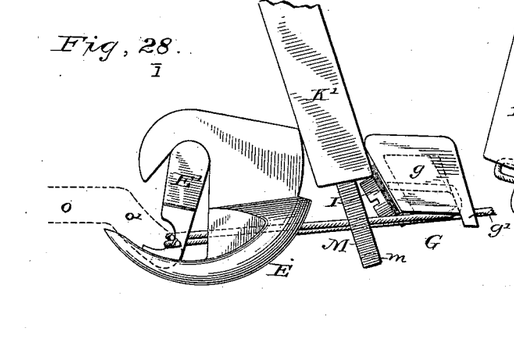
Figures 29, 32:
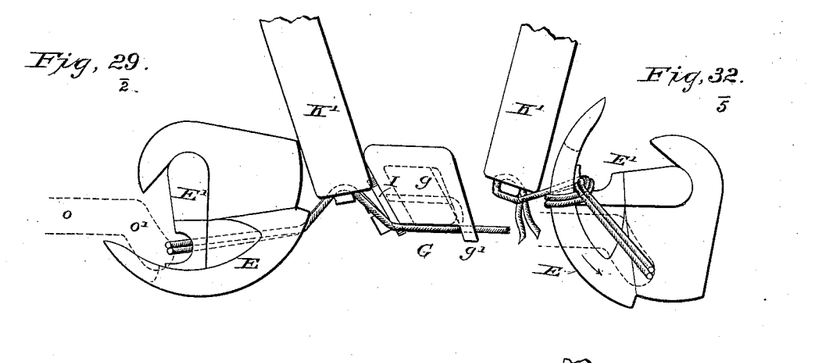
Figure 30:
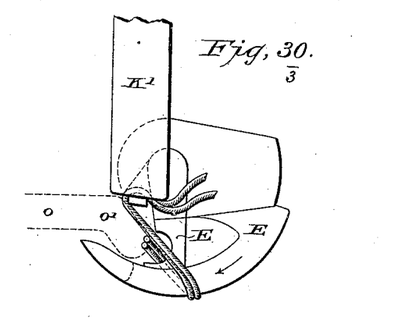
Figure 31:
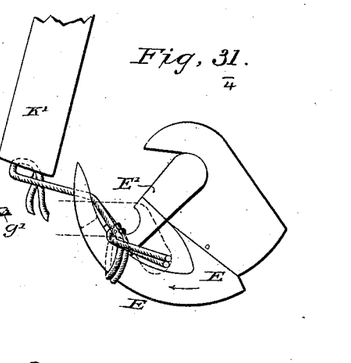
Figure 33:
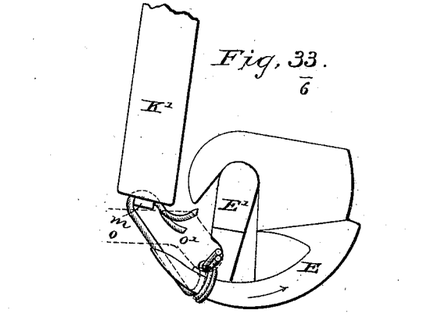
Figure 36:
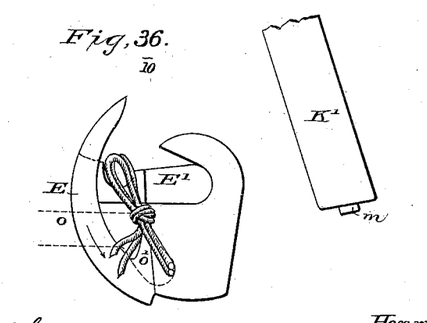
Figure 37:
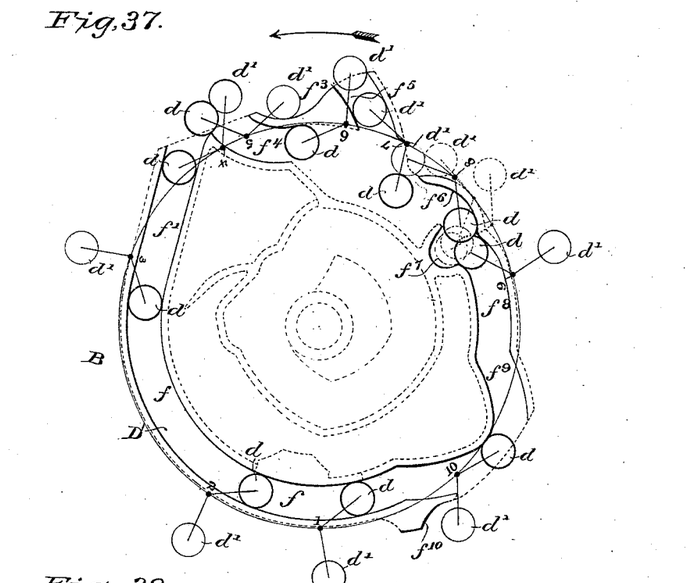
Fig. 37 shows the cam through which the knotter is given its movements, the small black dots on the fine circular line, with their numerals, indicating the center of the knotter-shaft relatively to the cam at the ten successive stages of operation already illustrated, and the active parts of the cam-disk, or those parts only which operate upon one or the other of the knotter-rollers, being shown by full lines, and all other parts of the disk by dotted lines.
Figure 38:
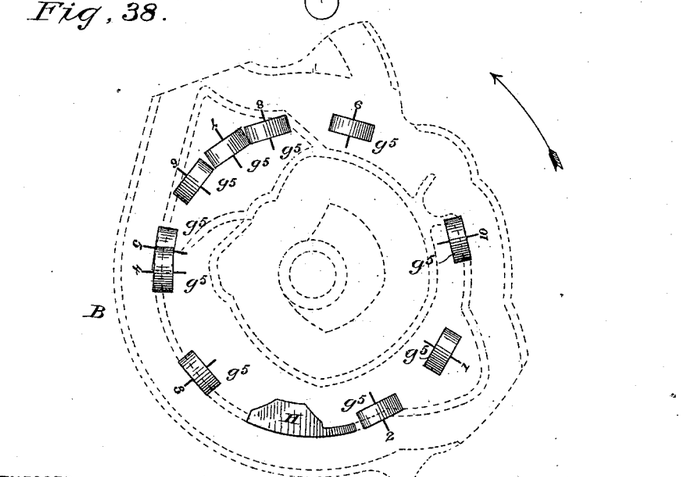
Fig. 38 shows the cam and the roller by which the jaw of the fixed cord-holder is operated, the active cam being shown here, as before, in full lines, and the successive stages by the ten numerals.
Figure 39:
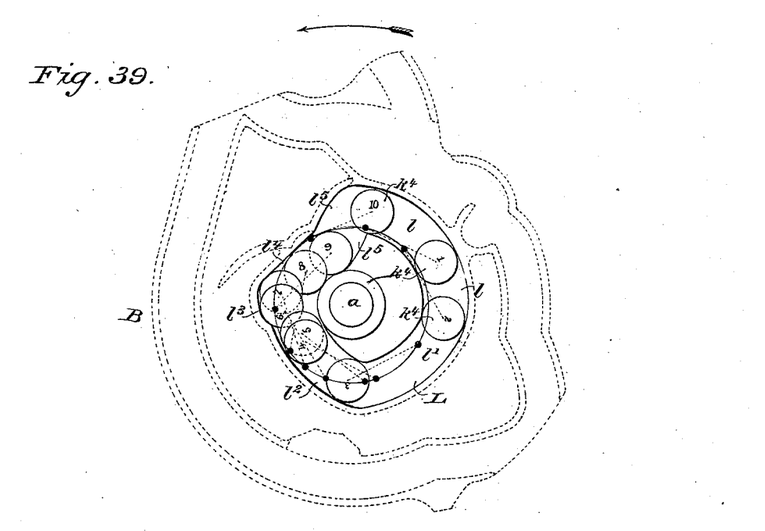
Fig. 39 represents the cam and roller by which the swinging cord-holder is given its variable motion upon its pivot, the numbered heavy black dots indicating the position of the pivot or center upon which the roller swings relatively to the cam at the ten successive stages of operation, and the straight dotted lines connecting the rollers with the dotted centers indicating the arm upon which the roller is mounted.
Figure 40:
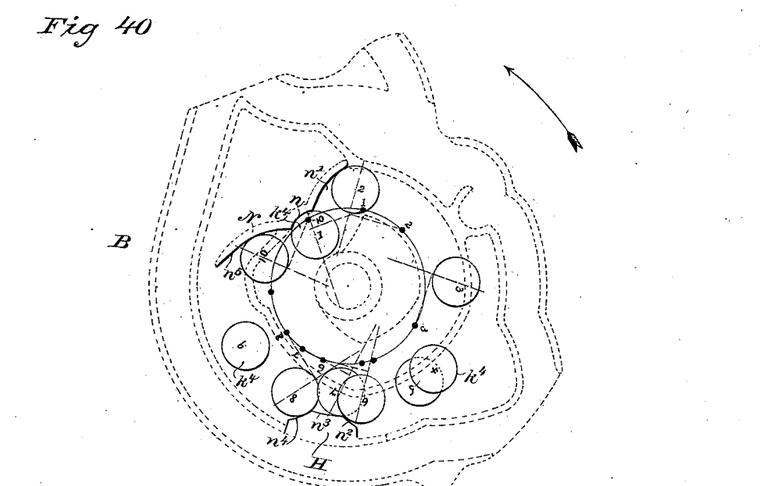
Fig. 40 shows the cam and roller for opening the hook of the swinging holder, the numbered black dots on the fine circular line indicating the pivotal center of the swinging arm in its position relatively to the cam in said ten successive stages, the dotted lines which cross the rollers indicating the direction of movement or the plane of movement relatively to the cam and pivotal center, and the dotted lines at right angles thereto being intended to form a gage or fixed mark by which the length of movement or reciprocation may be measured by the eye.

Mounted in a vertical boss, $c$, formed upon a plate, C, rigidly affixed to and practically forming a part of the stock, is a short shaft or spindle, D, which at its lower end, beneath said plate, is provided with two oppositely-extending arms carrying pendent anti-friction rollers $d$ $d'$, for the purpose of engaging with the outer cam track or groove, D', in the underlying cam-disk, and thereby oscillating said spindle at the proper times in the revolution of the disk. At its upper end this spindle has a horizontal jaw or bill, E, curved and cam-surfaced, as shown, and having near its point a chin or clamping-shoulder, $e$, being cut away from this chin toward the shank to admit of a second jaw, E', which is nearly radial to the axis of the bill, but at its point $e'$ comes against the chin thereon and projects slightly beneath, so as to leave a lip, $e^2$, for the crossed ends of the cord to come against, and whereby the strands are gathered in between the two jaws. Said second jaw has a spindle, $e^3$, entering a cylindrical socket in the spindle which carries the bill, and it is kept closely against and in contact with the chin on said bill by means of a coiled spring, $e^4$, seated at one end against the inner spindle and at the other end against the outer or inclosing one. Both jaws will therefore move together when the primary jaw or bill is moved, but the second or clamping jaw will always be permitted to yield when the cord comes in contact with its projecting edge or lip, so as to admit any strands of cord that come against its lip between itself and the chin of the other, and thus grasp them. Any suitable means that will properly oscillate this knotter to make the various motions necessary to tie the band may be employed. Those which I have devised, and which I at present deem preferable to use, are, as already indicated, the rollers upon the lower end or shank of the positive jaw and the outer cam-way in the revolving underlying disk, and the movements imparted are as follows:

When the knotter is in its position of rest, (indicated by the numeral 1 in Figs. 18, 28, and 37,) the roller $d$, which will be called the "inner" roller, since it is on the inner side of the bill, is in the concentric reach $f$ of the outer cam way or track, and the other roller is exterior to the track. This concentric reach continues a sufficient length to permit the binder-arm to descend and the cord to be grasped in the holder or holders after the disk commences to revolve in the outward traverse without any movement being imparted to the knotter. Then the inner roller enters the ensuing tangential reach $f'$ and the bill is swung inward to its full extent until the outer roller strikes the reversed curved exterior track, $f^3$, reversing the oscillation and throwing the inner into the next reach, $f^4$, which in turn has the effect of throwing the outer roller into the quick inwardly-inclined reach $f^5$, continuing the reverse oscillation until the tying-bill, which in the previous movement has grasped the crossed ends of the knot, has swung back much beyond its normal position, as in Fig. 34, and carrying the inner roller in advance of the outer, to allow which the main trackway at and along this point is widened. This brings the inner roller in contact with the inwardly-curved track $f^6$, by which it is deflected into a pocket, $f^7$, causing a second forward oscillation of the knotter and again throwing the outer roller through a suitable gate to the exterior of the trackway and in advance, bringing the knotter once more to its normal position, at which it rests for a moment, for a purpose presently explained, while the inner roller is following the short concentric reach $f^8$, then is carried on to the original inward limit by the action of a second tangential reach, $f^9$, upon said roller. The outer roller now strikes a short exterior track, $f^{10}$, and returns the knotter to its normal position, while the inner roller enters the initial concentric reach, and immediately thereafter, the outward traverse being ended, the revolution of the cam-disk ceases.

Upon the covering-plate of the stock, behind the knotter—that is, relatively to the movement of the binder-arm—is placed a standard or post, G, the top of which is saddled by a serrated clamping-jaw, $g$, having a hook, $g'$, depending at the outer side of the post. The shank G' of this jaw is pivoted to the plate by a bolt, $g^2$, at some distance from the post, and is pressed down by a strong spring seated against an overlying bridge or keeper, $g^3$, which rises from said plate. Between the pivot and the post said shank has a short hanger, $g^4$, passing through a bore in the stock or plate and having at its lower end an anti-friction roller, $g^5$, mounted on a horizontal pivot, which, shortly after the cam-disk begins to revolve and before the knotter has moved, is struck by a beveled projection or incline, H, thereon and forced up against the stress of the spring to open the jaw, so that the cord brought alongside the post by the binder-arm may be received beneath said jaw. As soon as the incline has passed, the jaw is forced down by the spring and secures the cord. Between this stationary holder and the knotter, and close alongside the post, is a knife, I, beveled at its upper edge, against which the cord-strand last brought down by the binder-arm is sheared and severed by the closing of the jaw.

At a point on the covering-plate or stock nearly diametrically opposite the knotter or tying-bill is formed a vertical pivot for the tubular shank K of a secondary holder-frame, K', said frame being made rigid with the shank, but at right angles thereto, so as to project horizontally over the plate, and of such length that its free end comes alongside the jaws of the stationary holder, but does not pass them. This frame is channeled on one side to afford a way or guide, $k$, and is slotted in continuation of such way to form clamping-cheeks $k'$ at its extreme end. An arm, $K^2$, projects laterally from the foot of the shank, and has a pendent lug, $k^2$, passing through a slot, $k^3$, in the covering-plate, and armed therebeneath with a roller, $k^4$, which enters a camway, L, in the disk, whereby a vibratory or swinging movement is imparted to the frame as the disk revolves. During the inward traverse, while the binding devices are at rest, this roller is at the point indicated by the numeral 1 in the concentric reach $l$ of its camway, holding the swinging frame up against or in close proximity to the stationary holder. When the outward traverse commences and the cam-disk begins to revolve, it travels for a time in this reach until the cord has been brought down alongside the stationary holder by the binder-arm, when it enters the inwardly-curved or tangential reach $l'$, swinging the frame away from the stationary holder and past the knotter, which then commences its movement. At this instant a still sharper inward incline or reach, $l^2$, accelerates the motion of the swinging holder until it reaches the limit of its first or forward vibration. Next it enters a short pocket or bulging reach, $l^3$, which carries the frame back alongside the knotter for a moment, and from this passes into another inwardly-inclined or tangential reach, $l^4$, returning the frame to the limit of its vibration away from the stationary holder to avoid interference with the knotter, and finally it passes up the outward incline or reach, $l^5$, restoring the frame to position alongside the stationary holder, and gains the starting reach, where it comes to rest in its original position.

A bar, M, fits in the lateral channel in the swinging holder-frame, so as to be reciprocated back and forth therein, and at its end has a curved hook, $m$, which plays through the clamping-cheeks in the reciprocations of the bar to grasp the cord-strands and draw them against and between the cheeks. The bar is pressed back in the grasping and holding movement by a strong coiled spring, $m'$, seated in a case, $m^2$, upon the frame and adjustable in stress by means of a set-screw, $m^3$, threaded into a lug, $m^4$, on the bar and pressing against a washer, $m^5$, which forms the actual seat for the adjacent end of the spring. The rigid shank M' of this clamping-bar lies alongside of and is parallel with the shank of the holder-frame, but extends directly through the covering-plate, which is slotted at $m^6$ for that purpose, and beneath said plate has a roller, $m^7$, which, however, is in a higher plane than the roller on the arm from the holder-shank, or does not extend so far below the plate, so that it will not be affected or actuated by the camway for the latter, but only by its own cam-track N, which is raised above the other, and by a cam-track on the side of the wedge or incline H that opens the stationary holder, and which also projects above the other tracks. In its primary position, waiting for the descent of the binder-arm, this last roller rests in a pocket, $n$, in its track, and is held therein by the spring-pressure on the clamping-bar, thus acting as a dog to hold the cam-disk stationary during the inward traverse. This pocket, however, is sufficiently near the axis of the disk to cause the bar to be projected, so that its hook, extending alongside the stationary holder and into the path of the cord, may be ready to receive the latter. When the disk is started, the roller rides out of the pocket, further projecting the hook, so that it may spring over the taut strands if they are not already caught behind it. Then the roller is let away rapidly by the outwardly-flaring reach $n'$ as the spring retracts the clamping-hook with the strands in its grasp, and immediately thereafter the swinging holder commences to move away from the stationary holder. From this time on the clamping-bar roller is idle until the swinging holder is in its movements represented by the numerals 6 and 7—that is, the first return movement toward the knotter and then away therefrom—when it strikes the inward reach or track, $n^2$, on the side of the inclined lift for the stationary holder, and is forced against the stress of the spring to project the clamping-hook and release the end strands of cord held thereby, passing thence upon a short concentric reach, $n^3$, which insures the hook remaining open a sufficient time for the strands to be certainly drawn therefrom, and then escaping along the outward flare, $n^4$, which has for its purpose merely to ease the movement. Finally, as the swinging holder is again approaching its position of rest, the roller strikes and rides along the inward incline, $n^5$, until it reaches and falls into the pocket from which it started, dogging the cam-disk and holding the clamping-hook projected until the next binding operation.

The knotter or tying-bill is covered and shielded by a bridging cap-plate, O, independent of and beneath the usual decking, though such plate may be dispensed with if thought desirable, owing to the position of the binding-head or its relations, whether fixed or reciprocating. This cap-plate has a slot, $o$, to admit the cord to the range of the knotter, terminating in an oblique length, $o'$, which deflects the strands adjacent to the gavel and brings them close to the knotter-spindle and on the inner side of the bill, while the old end extends along and the binder-arm carries the new end past the outer side of bill and spindle. The mouth of the slot, at the oblique side thereof, has a downwardly and outwardly curved guard-finger, $o^2$, intended to guide the strands with certainty therein as they are laid in the rise and fall of the binder-arm and to prevent their escape.

In operation, one strand of cord being already grasped in the stationary holder, bent under the pendent gathering-finger thereof, and from thence passing alongside the knotter up through the slot in the breast-plate as laid by the binder-arm in the previous operation, and a gavel having been collected, said arm comes down, encircling the gavel with the spool-strand of cord, carrying this strand past the outer side of the knotter and laying it alongside the first within the gathering-finger of the stationary holder. Both strands are now either lying within the clamping-hook of the swinging holder or will be sprung down and slipped therein when the hook receives its final projection. Then the hook suddenly recedes, clamping them firmly against its cheeks, and the movable jaw of the stationary holder opens, when the swinging holder immediately starts away therefrom, drawing the old strand released from beneath said jaw and springing the new strand over the fixed jaw, so that it will be caught as the other descends and severed by the knife. The swinging holder, continuing its movement, passes the tying-bill, sweeping over the top of its spindle, which is cut away for that purpose, to bring the holder closer to the jaws of the bill, and on the inner side thereof, thus looping the cord around said jaws and crossing the ends over the loop. As the holder passes the point or nose of the tying-bill, the latter begins and continues to move inward until it reaches the position indicated by the numeral 5 in the second groups of expository figures. This brings the lip on the yielding jaw against the strands held by the swinging holder and causes said jaw to retreat slightly against the force of its spring and admit the strands between itself and the opposing chin. The knot has now been laid and the tying-bill begins to recede in the reverse oscillation, while the movable holder follows it slightly to avoid pulling the knot off and unloosing it, opening, however, before the reverse oscillation of the bill is completed, to release the ends. The bill, having swung far enough back to tighten the knot by drawing the strands against the ends of the slot, will then move forward a second time, and the holder will also swing to the end of its first oscillation to avoid interference. This second forward oscillation of the bill is to insure the escape of the knot, since it will sometimes fail to escape after it has been drawn tight in the first reverse oscillation. The tying-bill in this movement makes a temporary stop when it reaches its original position of rest, during which the swinging holder moves past it toward and to its original position alongside the stationary holder. During this momentary stop the knot will almost certainly escape, if it has not already; but, lest it should not, the bill moves on as soon as cleared by the swinging holder and brings the strands against the inner side of the slot in its cap-plate, as indicated by the tenth numeral in the group referred to, prying the bow of the knot from between its jaws, and thus further tightening it as it is thus released. Finally the bill moves back to its position of rest, and all the parts are ready for a fresh binding operation.

I claim—

1. The combination, substantially as hereinbefore set forth, in a tying-bill, of two concentric spindles, a jaw extending from one of said spindles and having a reversely-set chin or grasping-shoulder near its point, a jaw extending from the other spindle alongside of the first until its nose comes in contact with said chin, mechanism which actuates said spindles and jaws to oscillate forward together, with said nose and chin in contact, until the cord has been looped and crossed, and then carries the first onward in advance of the second, thus opening the chin of the former away from the nose of the latter for the reception of the crossed ends of the cord, and mechanism which then, while said ends are still grasped, reverses the movement of the jaws and spindles to carry them simultaneously back to their initial position of rest to withdraw the jaws from the loop and tighten the knot.

2. The combination, substantially as hereinbefore set forth, in a tying-bill, of two concentric spindles, mechanism for positively moving one of said spindles upon its axis, a spring interposed between such spindle and the other and tending to carry it along in the said axial movement, a jaw extending from one of the spindles and having a chin or clamping-shoulder near its point, and a jaw extending from the other spindle until its nose comes in contact with said chin, whereby the jaws move together as the tying-bill is actuated.

3. The combination, substantially as hereinbefore set forth, in a tying-bill, of two concentric spindles, mechanism for positively actuating one of said spindles, a jaw with curved and cam surfaces extending at substantially right angles from said spindle and having a beveled point, and cut away behind that point to form a clamping or holding chin, a second jaw secured to the other spindle and lying alongside the first until its point comes in contact with the inner face of the chin and forms a lip outside thereof, and a coiled spring interposed between the two spindles to keep said latter jaw pressed against the chin, and moving as one with the other until its lip or projecting end comes in contact with the cord, and then permitting it to yield sufficiently for the cord to slip in between said end and the chin to be clamped therebetween.

4. The combination, substantially as hereinbefore set forth, of the positively-actuated knotter-spindle, the jaw projecting therefrom and having a clamping-chin behind its point, a shaft inclosed in a tubular socket in the spindle and having a shorter jaw terminating against the inner face of said chin, and the coiled spring interposed between the shaft and spindle and pressing the shaft in the same direction the spindle is primarily actuated.

5. The combination, substantially as hereinbefore set forth, of the spindle D, the bill E thereon, with its chin $e$, the loose inclosed shaft $e^3$, the jaw E', terminating against said chin and having the lip $e^2$, and the coiled spring interposed between the spindle and shaft.

6. The combination, substantially as hereinbefore set forth, with an oscillating tying-bill, of a swinging holder and means whereby it is operated to receive the cord-strands as they extend from and past the tying-bill and carry them by its swinging movement around the opposite side of the tyer-spindle in a plane practically transverse thereof, thereby assisting in winding them.

7. The combination, substantially as hereinbefore set forth, of an oscillating tying-bill, a stationary holder, a swinging holder, and means whereby it is operated to receive the cord-strands between the stationary holder and the tying-bill and wind them, after they have been severed, around the tying-bill in opposition to the forward movement of said bill.

8. The combination, substantially as hereinbefore set forth, with a tying-bill, of a stationary cord-holder, a swinging holder which receives the strands of cord between the stationary holder and the tying-bill, a knife whereby said strands are severed between the swinging holder and stationary holder, and mechanism actuating the swinging holder to first carry the strands past the tying-bill to assist in tying them, and next to carry them in the reverse direction to a point opposite the tying-bill to force them between its jaws.

9. The combination, substantially as hereinbefore set forth, of an oscillating tying-bill, a stationary cord-holder, a movable holder which grasps the band ends between the stationary holder and the tying-bill, and close to the former a knife which severs the final strand between the stationary and movable holder, and mechanism actuating said movable holder to move it away from the stationary holder and past the tying-bill to assist in winding the strands therearound, then returns it to a point opposite the tying-bill to deliver the strands to the jaws of the latter, and finally causes it to again recede therefrom and release said strands.

10. The combination, substantially as hereinbefore set forth, with the stationary holder, alongside of which the cord is delivered by the binding-arm, of a movable holder having a projecting clamping-hook which seizes the cord-strand brought down by the binder-arm and forces it laterally into the jaws of the stationary holder.

11. The combination, substantially as hereinbefore set forth, of a stationary holder composed of an upright post alongside which the cord is delivered by the binding-arm, a saddling jaw spring-pressed thereupon and intermittently opened by positive mechanism, and the swinging holder composed of a longitudinal casing and a clamping-hook which is projected from the end thereof before the jaw of the stationary holder opens to seize the strand brought down by the binder-arm, and is then retracted by a spring as the stationary holder opens, thereby drawing said strand laterally beneath the jaws thereof.

12. The combination, substantially as hereinbefore set forth, of the stationary holder with its clamping-jaw, the swinging holder with its projecting clamping-hook, and the knife arranged alongside the stationary holder and between it and the swinging holder.

13. The combination, substantially as hereinbefore set forth, of the stationary holder with its clamping-jaw, the down-hanging finger from said jaw, the swinging holder with its projecting clamping-hook, and the spring by which said hook is retracted.

14. The combination, substantially as hereinbefore set forth, with the oscillating knotter, of the rollers carried on the ends of arms projecting from its positive spindle, and the outer camway in the cam-disk, by which camway said rollers are given the movements described to actuate the tying-bill.

15. The combination, substantially as hereinbefore set forth, with the swinging cord-holder, of the anti-friction roller upon an arm from the lower end of its spindle, the inner camway in which said roller travels to swing the carrier, the short roller upon the shank of the clamping bar or hook, and the cam-tracks upon which it travels to project said hook.

16. The combination, substantially as hereinbefore set forth, with the oscillating knotter, the stationary cord-holder, and the swinging cord-holder, of the cam-disk with its successive tracks formed as described and actuating each of said devices in the manner stated.

17. The combination, substantially as hereinbefore set forth, with the stationary cord-holder, of the hanger on its spring-pressed jaw, the anti-friction roller turning on a horizontal pivot at the lower end of said hanger, and the beveled or inclined lug up which it travels to open said jaw.

18. The combination, substantially as hereinbefore set forth, to form a dogging device for the revolving cam-disk, of the roller on the shank of the spring-pressed cord-clamping hook, and the pocket in the cam-track on which said roller travels, into which the roller is forced by the stress of the spring.

19. The combination, substantially as hereinbefore set forth, with an oscillating tying-bill, of a cap-plate having a cord-slot trending obliquely at its end toward the inner or concave side of the bill to carry the strands from the gavel within its grasp, and provided with a downwardly and outwardly curved guard or guide finger at the mouth of the slot to deflect and direct the strands as they are laid by the binder-arm therein.

20. The combination, substantially as hereinbefore set forth, of an oscillating tying-bill, its slotted cap-plate, and mechanism which actuates said bill to carry its grasping-jaws past the inner side of the slot in a second oscillation after the knot has been laid, in order to pry the bow of the knot from between said jaws.

HENRY E. PRIDMORE.

Witnesses:
PAUL ARNOLD,
JOHN THORSELL.